(No Model.)

A. G. DEHLIN.
POTATO PARER AND SLICER.

No. 594,936. Patented Dec. 7, 1897.

Witnesses
Clarence L. White
Samuel Humes

Inventor
August G. Dehlin
By Frank E. Adams
Attorney

THE NORRIS PETERS CO., PHOTO-LITHO., WASHINGTON, D. C.

UNITED STATES PATENT OFFICE.

AUGUST G. DEHLIN, OF SEATTLE, WASHINGTON.

POTATO PARER AND SLICER.

SPECIFICATION forming part of Letters Patent No. 594,936, dated December 7, 1897.

Application filed October 27, 1896. Serial No. 610,241. (No model.)

*To all whom it may concern:*

Be it known that I, AUGUST G. DEHLIN, a citizen of the United States, residing at Seattle, in the county of King and State of Washington, have invented a certain new and useful Potato Parer and Slicer, of which the following is a specification.

My invention relates to improvements in potato-parers which are also adapted to slice the tuber; and the objects of my invention are, first, to provide means whereby the handle of the device may be firmly grasped and the tool thereby rendered effective in removing the skin and eyes and in slicing the tuber; second, to provide means whereby the cutters are set so as to operate effectively upon irregular surfaces of the tubers, and, third, to provide means whereby the cutters may be adjusted to remove different thicknesses of parings and slices and may be easily removed for sharpening and replaced without requiring skill. I attain these objects by the arrangement and form of the different parts, as indicated upon the accompanying drawings, in which—

Figure 1:
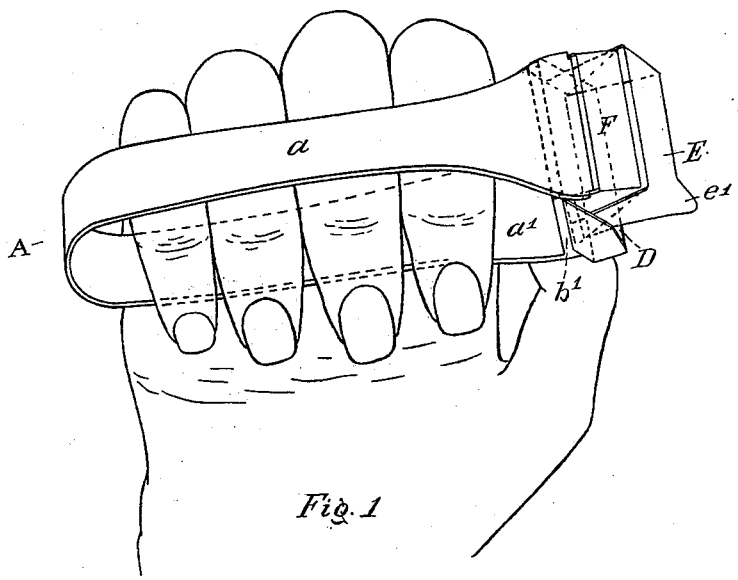
Figure 2:
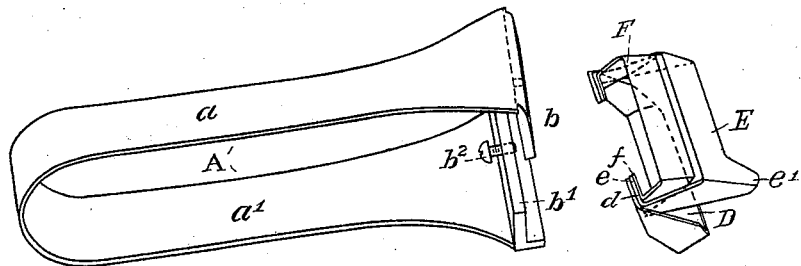
Figure 3:
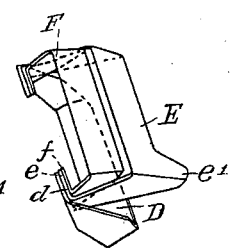
Figure 4:
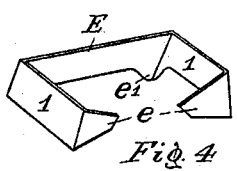
Figure 5:
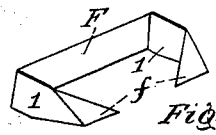
Figure 6:
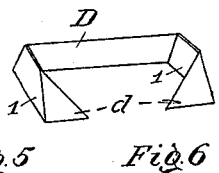

Figure 1 is a view of the parer as grasped in the hand of the operator preparatory to the removal of skin from a tuber; Fig. 2, a perspective view of the handle of the parer with the clamping-jaws separated and the cutters removed; Fig. 3, a perspective view of the removed cutters in their relative position to each other when clamped between the jaws of the handle, and Figs. 4, 5, and 6 are perspective views of the paring and eye-removing and paring and slicing cutters, respectively.

Similar letters refer to similar parts throughout the several views.

Referring to the views on the accompanying drawings, A indicates the handle of the tool, which is formed of one piece of material, but has two shanks $a$ and $a'$, each of which is provided with a transverse jaw, as $b$ and $b'$, which lap each other, with a space between adapted to receive the tongues $d$, $e$, and $f$ of the cutters D, E, and F, and are adapted to retain said cutters in their respective positions when clamped by the screw $b^2$, which has threaded connection with each of said jaws.

The outer ends of the sides 1 of the cutters are adapted to fit within each other and the tongues thereof to fit upon each other when clamped between the jaws $b$ and $b'$ by the screw $b^2$, the tongues having the proper angle with the blades to insure the desired position of the cutters when set in the jaws.

The blades of the cutters E and F are at an angle with each other when set in position for paring, the cutting edge 2 of the cutter E being slightly raised above the blade of the cutter F and the blades thereof forming an obtuse angle with reference to their outer surfaces. This position of the paring-blades insures a removal of the skin from irregular surfaces, as the blade of the cutter E may be made to enter depressions which the first cutter F would pass over by rocking the handle A upon the blades in passing them over the surface of the potato. The blade of the cutter F is raised above the outer surface of the shank $a$ the required distance to remove a paring of the desired thickness and may be adjusted by turning the screw $b^2$ and releasing the pressure of the clamps, when the cutter may be raised or lowered. This is also the case when desirable to adjust the other cutters.

On the cutter E, I have provided a corner projection $e'$, formed in trowel shape, adapted to cut or dig the eyes from the potato.

The cutter D is adapted for slicing and may be adjusted, as heretofore described, for different thicknesses of slices, which pass beneath the blade, the handle A being grasped by the shank $a$ in one hand while the potato is held in the other.

To operate upon a tuber with the tool, the handle A is grasped, as shown in Fig. 1, in one hand, while the tuber is held in the other, and the blades of the cutters F and E are drawn across the surface, the tool being rocked or tipped, as heretofore explained, when operating upon irregular portions. After the skin is removed the trowel portion $e'$ may be used to cut away the eyes, and, if desirable, the handle A may then be grasped by the shank $a$ and the cutter D employed to slice the potato.

Upon reference to Fig. 1 it will be seen that the fingers of the operator pass between the shanks $a$ and $a'$ of the handle A. This insures a firm though easy grasp of the shank and permits a continued use of the parer without tiring or hurting the hand. The backs of the fingers, coming in contact with the under surface of the upper shank, assist in steadying the tool.

When desirable to remove the cutters from the handle, the screw $b^2$ is removed from the jaw $b$ and the jaws separated by pulling apart the ends of the shanks $a$ and $a'$, as indicated in Fig. 2, whereupon the cutters may be withdrawn and replaced and clamped in position by closing the jaws together and screwing the screw $b^2$ in place.

I am aware that prior to my invention numerous devices have been employed for paring and slicing potatoes. I therefore do not claim such an invention broadly; but, Having fully described my invention, what I do claim, and desire to secure by Letters Patent, is—

1. In potato-parers, the handle thereof comprising parallel shanks with a space between, transverse jaws overlapping and a screw threaded therethrough adapted to clamp cutters therebetween at the ends of said shanks, substantially as shown and described.

2. In potato-parers, the combination with the handle thereof comprising parallel shanks, with a space between, transverse jaws overlapping and a clamping-screw threaded therethrough, of the cutters clamped between said jaws comprising paring-blades forming an obtuse angle on one side and a slicing-blade on the opposite side of the handle at the ends of said shanks, substantially as shown and set forth.

AUGUST G. DEHLIN.

Witnesses:
FRANK E. ADAMS,
SAMUEL M. HUMES.